United States Patent
Sasakura et al.

(10) Patent No.: US 8,603,360 B2
(45) Date of Patent: Dec. 10, 2013

(54) EMITTING PHOSPHOR

(75) Inventors: Asuka Sasakura, Ageo (JP); Jun-ichi Itoh, Ageo (JP); Taizo Morinaka, Hida (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 13/258,940

(22) PCT Filed: Jun. 2, 2010

(86) PCT No.: PCT/JP2010/059333
§ 371 (c)(1),
(2), (4) Date: Sep. 22, 2011

(87) PCT Pub. No.: WO2011/033830
PCT Pub. Date: Mar. 24, 2011

(65) Prior Publication Data
US 2012/0018674 A1      Jan. 26, 2012

(30) Foreign Application Priority Data

Sep. 18, 2009   (JP) ................................. 2009-216727

(51) Int. Cl.
C09K 11/08    (2006.01)
C09K 11/56    (2006.01)

(52) U.S. Cl.
USPC .................................................. 252/301.4 S

(58) Field of Classification Search
USPC ............ 252/301.4 R, 301.4 S; 313/487, 495, 313/498, 503
See application file for complete search history.

(56) References Cited

U.S. PATENT DOCUMENTS

| | | | |
|---|---|---|---|
| 5,612,591 A | 3/1997 | Katayama et al. | |
| 5,780,966 A | 7/1998 | Kato et al. | |
| 5,892,333 A * | 4/1999 | Mizutani et al. | 313/506 |
| 6,544,438 B2 * | 4/2003 | Yocom et al. | 252/301.4 S |
| 6,686,691 B1 | 2/2004 | Mueller et al. | |
| 7,368,179 B2 | 5/2008 | Tian et al. | |
| 7,832,312 B2 | 11/2010 | Yoon et al. | |
| 8,147,717 B2 * | 4/2012 | Ogawara et al. | 252/301.4 S |
| 2007/0023734 A1 * | 2/2007 | Igarashi et al. | 252/301.4 S |
| 2008/0259251 A1 * | 10/2008 | Heo et al. | 349/69 |
| 2009/0039759 A1 * | 2/2009 | Yokosawa et al. | 313/495 |

FOREIGN PATENT DOCUMENTS

| | | |
|---|---|---|
| JP | 2002060747 A | 2/2002 |
| JP | 2006524437 A | 10/2006 |
| JP | 2007056267 A | 3/2007 |
| JP | 2007214579 A | 8/2007 |
| JP | 2009293022 A * | 12/2009 |
| WO | 2007080555 A1 | 7/2007 |

OTHER PUBLICATIONS

Machine translation of JP2009-293022A.*

(Continued)

*Primary Examiner* — Emily Le
*Assistant Examiner* — Lynne Edmondson
(74) *Attorney, Agent, or Firm* — The Webb Law Firm

(57) ABSTRACT

An emitting phosphor is provided, which can be excited by a blue LED or a near-UV LED, emit visible light and increase internal quantum efficiency. An emitting phosphor is proposed, comprising an orthorhombic crystal system comprising Ga and S, wherein the orthorhombic crystal system has, in an XRD pattern using a Cu Kα beam, a proportion of the diffraction intensity of the maximum peak appearing at diffraction angle 2θ=16.0 to 18.0° with respect to the diffraction intensity of the maximum peak appearing at diffraction angle 2θ=23.6 to 24.8° of 0.4 or greater.

9 Claims, 5 Drawing Sheets

Example 1

(56) References Cited

OTHER PUBLICATIONS

Kato, A. et al., "Optical gain due to the Eu transition in the alloy of Ca1—xEuxGa2S4", Journal of Physics and Chemistry of Solids, 2005, pp. 2076-2078, vol. 66, Elsevier.

Xu, Jian, "MGa2S4:Eu2+(M=Ca,Sr,Ba) EuGa2S4", Acta Scientiarum Naturalium Universitatis Sunyatseni, May 2004, pp. 49-51, vol. 43, No. 3.

Xu, Jian, "Ga2S3:Eu2+ SrGa2+xSr+y:Eu2+", Journal of the Chinese Rare Earth Society, Dec. 2003, pp. 635-638, vol. 21, No. 6.

Najafov H. et al., "Effect of Co-Doping on CaGa2S4:Eu Phosphor:I. Energy Transfer from CE to EU Ions", Japanese Journal of Applied Physics, The Japan Society of Applied Physics, Japan Society of Applied Physics, Tokyo, JP, vol. 41, No. 3A, Part 01, Mar. 2002, pp. 1424-1430, XP001192138, Issn:0021-4922, DOI:10.1143/JJAP.41. 1424.

* cited by examiner

Comparative example 1

EMITTING PHOSPHOR the present invention relates to an emitting phosphor. Specifically, it relates to an emitting phosphor that can be excited with a blue LED or a near-UV LED and emit visible light.

BACKGROUND OF THE INVENTION

The current mainstream light sources for illumination are fluorescent lights and incandescent light bulbs; however, compared to fluorescent lights and the like, those using an LED (light-emitting diode) as a light source have small power consumption, longer life span, are excellent on the aspect of safety such as not being hot to the touch, moreover, do not contain toxic substances such as mercury and are also excellent on the aspects of environment, such that they are anticipated to become main stream light sources for illumination in the near future.

White LEDs currently in use are constituted by combining a blue LED and a YAG:Ce (yellow emitting phosphor), and bear the problem that they have poor color rendering properties to demonstrate natural color generation ability, such that, particularly when a red-colored object or a person's skin is illuminated with such white LEDs currently in use, colors illuminated by natural light cannot be reproduced. Thus, as a method for improving the color rendering properties of such white LEDs currently in use, constituting a white LED by combining a near-UV LED and 3 species of emitting phosphors, red, green and blue, or by combining a blue LED and two species of emitting phosphors, red and green, is being examined, and $SrGa_2S_4$:Eu has been described as a green emitting phosphor to be used for such purposes (refer to Patent References 1, 2 and 3).

[Patent Reference 1] Japanese Patent Application Laid-open No. 2002-060747

[Patent Reference 2] Japanese Patent Application Laid-open No. 2007-056267

[Patent Reference 3] Japanese Patent Application Laid-open No. 2007-214579

SUMMARY OF THE INVENTION

In conventional art, emitting phosphors comprising an orthorhombic crystal system, of which a representative is the described $SrGa_2S_4$:Eu, needed to increase light emission efficiency further. It is told that using an emitting phosphor with a high external quantum efficiency (=internal quantum efficiency×absorption ratio) is important to increase light emission efficiency. However, for instance as described previously, when a near-UV LED or a blue LED and emitting phosphors are combined to obtain white light, it is necessary to increase the internal quantum efficiency of the emitting phosphor to increase external quantum efficiency, or increase the light emission intensity of the emitting phosphor.

Thus, the present invention provides an emitting phosphor with a greatly higher internal quantum efficiency.

The present invention proposes an emitting phosphor containing an orthorhombic crystal system containing Ga and S, the orthorhombic crystal system satisfying, in an XRD pattern using Cu Kα beam, a proportion of the diffraction intensity of the maximum peak appearing at diffraction angle $2\theta=16.0$ to $18.0°$ with respect to the diffraction intensity of the maximum peak appearing at diffraction angle $2\theta=23.6$ to $24.8°$ of 0.4 or greater, or a proportion of the diffraction intensity of the maximum peak appearing at diffraction angle $2\theta=33.6$ to $36.0°$ with respect to the diffraction intensity of the maximum peak appearing at diffraction angle $2\theta=37.5$ to $39.5°$ of 0.7 or greater, or both of these.

The emitting phosphor of the present invention having such characteristics is characterized by being efficiently excited with a light of 250 nm to 510 nm wavelength (that is to say, near-ultra violet light to blue light), in particular with a blue LED (around 450 nm wavelength), to emit visible light, and a remarkably high internal quantum efficiency.

Consequently, for instance when a white light-emitting device or unit is constituted by combining a blue LED as an excitation source and the emitting phosphor of the present invention, since the internal quantum efficiency is high, light emission efficiency is high, allowing a more sufficiently white light to be obtained. In addition, a sufficient amount of light emission can be obtained even when a limited amount of emitting phosphors is combined with an LED with limited properties.

Figure 1:
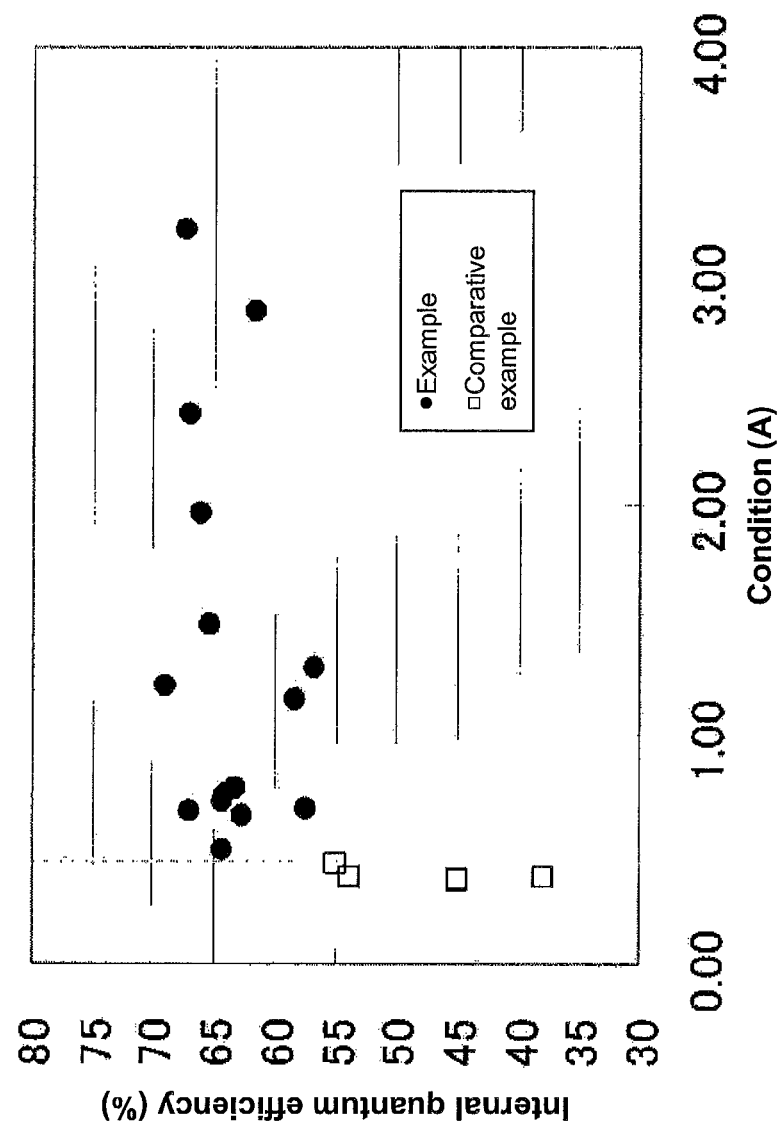
FIG. 1 in which the values for the emitting phosphor powders obtained in Examples 1-19 and Comparative Examples 1-9 have been plotted on the coordinates comprising the horizontal axis: proportion of the diffraction intensity of the maximum peak appearing at diffraction angle $2\theta=16.0$ to $18.0°$ with respect to the diffraction intensity of the maximum peak appearing at diffraction angle $2\theta=23.6$ to $24.8°$; and the vertical axis: internal quantum efficiency (%)

Hereafter, embodiments of the present invention will be described in detail; however, the scope of the present invention is not to be limited to the examples described below.

(The Present Emitting Phosphor)

The emitting phosphor according to the present embodiment (hereafter referred to as "the present emitting phosphor") is an emitting phosphor containing a host material containing Ga and S, and an activator (also referred to as "luminescent center").

(Host Material)

The host material of the present emitting phosphor is an orthorhombic crystal system (also referred to as "the present orthorhombic crystal system body") containing Ga and S which is characterized in that, in an XRD pattern using a Cu Kα beam, the proportion of the diffraction intensity of the maximum peak appearing at diffraction angle $2\theta=16.0$ to 18.0° with respect to the diffraction intensity of the maximum peak appearing at diffraction angle 2θ=23.6 to 24.8° is 0.4 or greater, or, the proportion of the diffraction intensity of the maximum peak appearing at diffraction angle 2θ=33.6 to 36.0° with respect to the diffraction intensity of the maximum peak appearing at diffraction angle 2θ=37.5 to 39.5° is 0.7 or greater.

It has been verified that, for instance, $CaGa_2S_4$ and $SrGa_2S_4$, and the like, are orthorhombic crystal systems, and that $CaGa_2S_4$:Eu and $SrGa_2S_4$:Eu, which have these as host materials, are excited with good efficiency by a blue LED (around 450 nm wavelength) and emit visible light. In contrast, it has been verified that, although being a crystal body containing Ga and S, $BaGa_2S_4$, or the like, is a cubic crystal, the XRD pattern being entirely different from an orthorhombic crystal system, and that, with a blue LED (around 450 nm wavelength), light is not emitted efficiently.

It is desirable that the present orthorhombic crystal system body is a crystal body of a sulfide containing, for instance, Ga and one species of alkaline earth metal M among Ba, Sr and Ca, or two species or more among these.

Among them, those with ratios of the contents in Ba, Sr and Ca occupied in the alkaline earth metal M satisfy the following Formula (1) is desirable:

$$M=Ba_xSr_{1-x-y}Ca_y \text{ (x is 0 or greater but 0.6 or less and y is 0 or greater but 1 or less)} \quad (1)$$

In this Formula (1), if x is 0 or greater but 0.6 or less, the crystal structure of the orthorhombic crystal system can be maintained more certainly. From such a point of view, it is more desirable that x is 0.5 or less, and in particular 0.4 or less.

In addition, regarding y, the crystal body has the crystal structure of the orthorhombic crystal system in the entire range of 0 to 1, the XRD diffraction peak is shifted, and a solid solution of Ca into Sr has been verified.

More concretely, it is desirable that the present orthorhombic crystal system body is, for instance, a crystal body of a sulfide designated by any formula among $(Ba_{1-x}Sr_x)Ga_2S_4$ (where x is 0 or greater but 0.6 or less), $(Sr_{1-y}Ca_y)Ga_2S_4$ (where y is 0 or greater but 1 or less) and $(Ba_{1-x-y}Sr_xCa_y)Ga_2S_4$ (where x is 0 or greater but 0.4 or less and y is 0 or greater but 1 or less), or, a mixture of crystalline bodies of sulfides comprising two or more species from among these.

In addition, if the present orthorhombic crystal system body is a crystal body of a sulfide designated by the formula $MGa_2S_4$ (M is an alkaline earth metal) as described above, from the stoichiometric composition, it contains Ga at a proportion of 2.00 moles with respect to 1.0 mole of M; however, from the point of view of obtaining the characteristics according to x-ray diffraction as described above, in the present emitting phosphor, it is desirable that Ga is contained in excess of the stoichiometric composition only by a prescribed amount.

In so doing, it is desirable that Ga is contained in excess such that the molar ratio of the Ga content with respect to the M content (Ga/M) is 2.02 to 3.02. In particular, a lower limit value thereof of 2.02 or greater, of which in particular 2.21 or greater, is desirable, and an upper limit value of 2.72 or less, of which in particular 2.45 or less, is desirable. (1): It is desirable for the present orthorhombic crystal system body that, in an XRD pattern using a Cu Kα beam, the proportion of the diffraction intensity of the maximum peak appearing at diffraction angle 2θ=16.0 to 18.0° with respect to the diffraction intensity of the maximum peak appearing at diffraction angle 2θ=23.6 to 24.8° is 0.4 or greater (Condition (A)).

An emitting phosphor with an orthorhombic crystal system body satisfying Condition (A) as the host material can be excited by a blue LED (around 450 nm wavelength) with good efficiency, emit visible light and increase internal quantum efficiency remarkably.

From such point of view, it is desirable that the proportion is 0.4 or greater, and more desirable is in particular 0.46 or greater, and on the other hand, 10 or less is desirable and in particular 8 or less is more desirable.

In addition, it is desirable for the present orthorhombic crystal system body that, in an XRD pattern using a Cu Kα beam, the proportion of the diffraction intensity of the maximum peak appearing at diffraction angle 2θ=33.6 to 36.0° with respect to the diffraction intensity of the maximum peak appearing at diffraction angle 2θ=37.5 to 39.5° is 0.7 or greater (Condition (B)).

An emitting phosphor with an orthorhombic crystal system body satisfying Condition (B) as the host material can also be excited by a blue LED (around 450 nm wavelength) with good efficiency, emit visible light and increase internal quantum efficiency remarkably.

Thus, from such point of view, it is desirable that the proportion is 0.7 or greater, more desirable is in particular 1 or greater, and on the other hand, 10 or less is desirable and in particular 8 or less is more desirable.

While it suffices that the present orthorhombic crystal system body satisfies either of Conditions (A) and (B), satisfying both is more desirable from the point of suppressing variations in product quality.

Note that, in order to prepare an emitting phosphor so as to satisfy Condition (A) or (B), for instance, the method of including Ga in excess of the stoichiometric composition can be cited.

It suffices that the present emitting phosphor contains the present orthorhombic crystal system body. That is to say, if the emitting phosphor contains the present orthorhombic crystal system body, the emitting phosphor may contain another crystal body. For instance, although $BaGa_2S_4$ or the like is a cubic crystal and has been verified to not emit light efficiently with a blue LED (around 450 nm wavelength) as described above, if the emitting phosphor contains the present orthorhombic crystal system body, the effects of the present emitting phosphor can be delivered even if the emitting phosphor contains $BaGa_2S_4$ or the like.

In so doing, a content of the present orthorhombic crystal system body occupying 100 to 40 mass % in the present emitting phosphor (excluding the activator) is desirable, in particular 100 to 50 mass %, of which 100 to 60 mass %, of which 100 to 80 mass %, and in particular occupying 100 mass % is desirable.

(Activator)

As the activator of the present emitting phosphor (luminescent center), for instance Eu, Ce, Mn and Sm and the like can be cited; the activator may contain one species alone among these, in addition, the activator may use in combination and contain two or more species among these. Among these, from the point of view of high internal quantum efficiency with a blue LED (around 450 nm wavelength) excitation, those activators containing a divalent $Eu^{2+}$ and in particular divalent $Eu^{2+}$ alone, are desirable.

For the concentration of luminescent center (for instance $Eu^{2+}$), a molar ratio that gives 0.001 to 0.10 molar when the total amount (concentration) of the alkaline earth metal M in the host material is taken as 1.00 molar is desirable, of which a molar ratio that gives 0.005 to 0.07 molar, of which in particular 0.01 to 0.05 molar, is desirable.

Note that it is also possible to anticipate similar effects using as the luminescent center (luminescent ion), one species or two or more species of ions chosen from a group comprising rare earth ions and transitional metal ions other than those described above. As rare earth ions, for instance, ions of Sc, Tb, Er and the like may be cited, and as transitional metal ions, for instance, ions of Cu, Ag, Cr, Ti and the like can be cited.

(Characteristics of the Present Emitting Phosphor)

The present emitting phosphor has the characteristics of being excited by light with a wavelength in the near-UV region to the blue region (on the order of 250 nm to 510 nm), being efficiently excited in particular by light from a blue LED (around 450 nm wavelength), and emitting visible light, for instance, emitting light from green to yellow.

As a word regarding the emission spectrum of the present emitting phosphor, the emitting phosphor has a light emission peak in the region of 450 nm ±30 nm to 700 nm ±30 nm wavelength by light excitation at on the order of 250 nm to 510 nm wavelength.

(Production Method)

Hereafter, one example of preferred production method for the present emitting phosphor will be described. However, there is no limitation to the production method described below.

The present emitting phosphor can be obtained by respectively weighing and mixing raw materials, firing in a reducing atmosphere at 900 to 1400° C., crushing with a stamp mill, a automatic mortar grinder or the like, then, sorting with a sieve or the like, as necessary annealing, preferably further precipitating with a non-aqueous organic solvent, ethanol to begin with, or water, removing the supernatant and drying.

Here, when the present orthorhombic crystal system body is a crystal body of sulfide containing, for instance, Ga and alkaline earth metals such as Ba, Sr and Ca, it suffices to weigh and mix, for instance Ga raw materials, alkaline earth metal raw materials such as of Ba, Sr and Ca, S raw materials, and luminescent center (activator) raw materials, as raw materials.

In so doing, gallium salts such as $Ga_2O_3$ and $Ga_2S_3$ can be cited as Ga raw materials.

As alkaline earth metal raw materials such as of Ba, Sr and Ca, in addition to oxides of alkaline earth metals, sulfides, complex oxides, nitrates, sulfates, carbonates and the like, can be cited.

As S raw materials, S, BaS, $SiS_2$, $Ce_2S_3$, $H_2S$ gas and the like can be cited in addition to SrS.

In addition, as luminescent center (activator) raw materials, for instance, as Eu raw materials, salts such as oxides, sulfides, complex oxides, nitrates, sulfates and carbonates such as EuS, $EuF_3$ and $Eu_2O_3$, and halides such as $EuCl_3$ can be cited.

In the production method for the present emitting phosphor, in order to obtain the characteristics according to x-ray diffraction as described above, for instance, mixing Ga in excess of the stoichiometric composition is desirable. However, there is no limitation to this method.

That is to say, although from the stoichiometric composition designated by, for instance, $MGa_2S_4$ (M is an alkaline earth metal), production is in general by mixing Ga at a proportion of 2.00 moles with respect to 1.00 mole of M, in the case of the present emitting phosphor, it is desirable that Ga is mixed and included in excess of the stoichiometric composition designated by $MGa_2S_4$ only by a prescribed amount. Concretely, including Ga in excess to the extent that the molar ratio of the Ga content with respect to the M content (Ga/M) becomes 2.02 to 3.02, in particular 2.02 to 2.72, of which in particular to the extent that the ratio becomes 2.21 to 2.45, is desirable.

Thus, the characteristics according to x-ray diffraction as described above can be obtained also by increasing the molar ratio of the Ga content with respect to the M content (Ga/M) to greater than 2.00.

In addition, the characteristics according to x-ray diffraction as described above can be obtained also by flux of $MgCl_2$, $CaCl_2$, $NaCl_2$, NaCl, KCl, Kl, $SrF_2$, $EuF_3$ and the like.

Note that, in order to improve color rendering properties, rare earth elements such as Pr and Sm may be added to the raw materials as color adjusters.

In order to increase the excitation efficiency, one or more species of elements selected from the elements of the rare earth family, such as Sc, La, Gd and Lu, may be added as sensitizers.

However, it is desirable that the amounts thereof added are respectively 5 mol % or less with respect to Sr. If the contents in these elements exceed 5 mol %, there is the danger that large amounts of phases will deposit, notably decreasing the brightness.

In addition, alkaline metal elements, monovalent cationic metals such as $Ag^+$, halogen ions such as $Cl^-$, $F^-$ and $I^-$ may also be added to the raw materials as electric charge compensators. From the points of charge compensation effect and brightness, it is desirable that the amounts thereof added are to the same extents as the aluminum family and rare earth family contents.

Mixing of the raw materials may be carried out either dry or wet.

When dry mixing, it suffices for instance to mix with a paint shaker, a ball mill or the like, using zirconia balls as a medium, as necessary drying, to obtain a raw materials mixture, which is not to limit the mixing method in particular.

When wet mixing, it suffices to bring the raw materials in a suspension state, and, using zirconia balls as a medium similarly to above, mix with a paint shaker, a ball mill or the like, then, separate the medium with a sieve or the like, and eliminate moisture from the suspension by a suitable drying method such as reduced pressure drying, vacuum drying or spray drying to obtain a dry raw materials mixture.

Adjustment of raw materials is also possible by synthesis in a liquid phase or gas-liquid phase. After preparing a precursor by, for example, sol-gel method, citric acid complex method, citric acid complex polymerization method, coprecipitation method, metal hydroxide precipitation method, homogeneous precipitation method, inorganic salt hydrolysis method, alkoxide method, oxidation-reduction method, hydrothermic method, emulsion method, solvent evaporation method, poor solvent dilution method and the like, may be sulfurized in $H_2S$ or $CS_2$ atmosphere or the like.

Prior to firing, the raw materials mixture obtained as described above may be ground, sorted and dried, as necessary. However, there is no absolute need to perform grinding, sorting and drying.

For firing, firing at 1000° C. to 1400° C. is desirable.

In so doing, as firing atmosphere, a nitrogen gas atmosphere containing a small amount of hydrogen gas, a carbon dioxide atmosphere containing carbon monoxide, an atmosphere of hydrogen sulfide, carbon disulfide, other inert gases or reductive gases, and the like, can be adopted, among which firing with hydrogen sulfide atmosphere is desirable.

The characteristics according to x-ray diffraction can also be adjusted with the firing temperature. For instance, mixing Ga in excess of the stoichiometric composition designated by $MGa_2S_4$ and firing at 1000° C. or higher, and in particular 1050° C. or higher, is desirable.

Although the upper limit of the firing temperature is determined by the endurable temperature of the firing oven, the decomposition temperature of the product, and the like, firing at 1000 to 1200° C. is particularly desirable in the production method for the present emitting phosphor. In addition, although the firing time is related to the firing temperature, suitably adjusting within a range of 2 hours to 24 hours is desirable.

In the above-mentioned firing, when the raw materials mixture does not contain sulfur raw materials, firing in an atmosphere of hydrogen sulfide or carbon disulfide is desirable. However, when sulfur raw materials are contained in the raw materials mixture, firing is possible in an atmosphere of hydrogen sulfide, carbon disulfide or inert gas. In this case, hydrogen sulfide and carbon disulfide are sometimes turned into sulfur compounds and also have the function of suppressing decomposition of the products.

Meanwhile, when using hydrogen sulfide or carbon disulfide for the firing atmosphere, since these compounds are also turned into sulfur compounds, when, for instance, BaS is used as a raw material constituent, it is equivalent to using a barium compound and a sulfur compound.

In the production of the present emitting phosphor, it is desirable after firing to crush with a stamp mill, an automatic mortar grinder, a paint shaker and the like, and then sort with a sieve or the like. When crushing, it is desirable to adjust the crushing time so that the particle size does not become excessively fine.

In addition, in the sorting with a sieve or the like, it is desirable to sort so as to cut particle sizes larger than 150 µm, particularly particle sizes larger than 130 µm, and particularly among them, particle sizes larger than 110 µm. In addition, it is desirable to sort so as to cut particle sizes smaller than 2 µm, particularly particle sizes smaller than 3 µm, and particularly among them, particle sizes smaller than 4 µm.

After crushing as described above, annealing may be performed.

Although it is possible to adopt, as the atmosphere for annealing, a nitrogen gas atmosphere containing a small amount of hydrogen gas, a carbon dioxide atmosphere containing carbon monoxide, an atmosphere of hydrogen sulfide, carbon disulfide, other inert gases or reductive gases, and the like, among these, annealing in a hydrogen sulfide atmosphere is desirable.

As the annealing temperature, mixing Ga in excess of the stoichiometric composition designated by $MGa_2S_4$ and firing at 1000° C. or higher, and in particular 1050° C. or higher, is desirable.

Although the upper limit of the annealing temperature is determined by the endurable temperature of the oven, the decomposition temperature of the product, and the like, annealing at 1000 to 1200° C. is particularly desirable in the production method for the present emitting phosphor. In addition, although the annealing time is related to the annealing temperature, suitably adjusting within a range of 1 hour to 10 hours is desirable.

Furthermore, introducing the raw materials into a non-aqueous organic solvent, ethanol to begin with, water or the like, stirring while applying ultrasonic vibrations, then, letting the solution to stand still, eliminating the supernatant and recovering the precipitate, followed by drying, is desirable. This last solvent precipitation and sorting treatment allows the internal quantum efficiency and external quantum efficiency to be increased remarkably.

(Applications)

By combination with an excitation source, the present emitting phosphor can constitute a light-emitting device or unit, and can be used in various applications. It can be used, for instance, in addition to general lighting, in special light sources, backlights for liquid crystals, display devices such as display devices for EL, FED and CRT.

In so doing, light-emitting bodies that generate light at 250 nm to 510 nm wavelength (that is to say, violet light to blue light), of which blue LEDs of a around 450 nm wavelength, can be used preferably as excitation sources.

As one example of light-emitting device or unit combining the present emitting phosphor and an excitation source that may excite this, one can be constituted for instance by placing the present emitting phosphor in the vicinity of a light-emitting body generating light at 250 nm to 510 nm wavelength (that is to say, near-ultraviolet light to blue light), that is to say, a position where the light emitted by the light-emitting body may be received. Concretely, it suffices to layer an emitting phosphor layer comprising the present emitting phosphor over a light-emitting body layer comprising a light-emitting body.

In so doing, for the phosphor layer, it suffices to add, for instance, the present emitting phosphor in powder form along with a bonding agent to a suitable solvent, mix thoroughly to disperse the powder homogeneously, coat the obtained coating solution on the surface of the light-emitting layer and dry to form a coat film (phosphor layer).

In addition, it is also possible to form the phosphor layer by kneading the present emitting phosphor in a glass composition or a resin composition to disperse the present emitting phosphor within a glass layer or within a resin layer.

Furthermore, the present emitting phosphor may be formed into a sheet, and this sheet may be layered over a light-emitting body layer, and in addition, the present emitting phosphor may be sputtered directly over a light-emitting body layer to form a film.

Furthermore, the present emitting phosphor, a red emitting phosphor, as necessary a blue emitting phosphor or a yellow emitting phosphor, and an excitation source that may excite these can be combined to constitute a white light-emitting device or unit, which can be used, for instance, in addition to general lighting, in special light sources, backlights for liquid crystals, display devices such as display devices for EL, FED and CRT.

As one example of white light-emitting element or device constituted by combining the present emitting phosphor, a red phosphor, as necessary a blue phosphor, and an excitation source that may excite these, one can be constituted for instance by placing the present emitting phosphor, along with placing a red phosphor and as necessary a blue phosphor, in the vicinity of a light-emitting body generating light at 250 nm to 510 nm wavelength (that is to say, near-ultraviolet light to blue light), that is to say, a position where the light emitted by the light-emitting body may be received.

Concretely, it suffices to layer an emitting phosphor layer comprising the present emitting phosphor, an emitting phosphor layer comprising a red emitting phosphor, and as necessary an emitting phosphor layer comprising a blue emitting phosphor, over a light-emitting body layer comprising a light-emitting body.

In addition, it suffices to add, for instance, the present emitting phosphor, a red emitting phosphor and, as necessary, a blue or yellow emitting phosphor, in powder form along with a bonding agent to a suitable solvent, mix thoroughly to disperse the powders homogeneously, coat the obtained coating solution on the surface of the light-emitting layer and dry to form a coat film (emitting phosphor layer).

Furthermore, it is also possible to form the emitting phosphor layer by kneading the present emitting phosphor, a red emitting phosphor and, as necessary, a blue emitting phosphor in a glass composition or a resin composition to disperse the emitting phosphor within a glass layer or within a resin layer.

In addition, it suffices to form a emitting phosphor layer comprising the present emitting phosphor and a red emitting phosphor kneaded in a resin, over an excitation source comprising a blue LED or a near-UV LED.

Furthermore, the present emitting phosphor, a red emitting phosphor and, as necessary, a blue emitting phosphor may each be formed into a sheet, and this sheet may be layered over a light-emitting body layer, and in addition, the present emitting phosphor and a red emitting phosphor may be sputtered directly over a light-emitting body layer to form a film.

(Explanation of Terms)

In the present invention, "light-emitting element" in "light-emitting device or unit" means a light-emitting device provided with at least an emitting phosphor and a light-emitting source as an excitation source therefor, which emits light at a relatively small scale, and "light-emitting apparatus" means a light-emitting device provided with at least an emitting phosphor and a light-emitting source as an excitation source therefor, which emits light at a relatively large scale.

In the present invention, when "X to Y" (X and Y are any numbers) is stated, it includes the meaning of "X or greater but Y or less" along with the meaning of "preferably greater than X" or "preferably less than Y", unless expressly indicated otherwise.

In addition, when "X or greater" (X is any number) or "Y or less" (Y is any number) is stated, it includes the meaning to the effect of "greater than X is desirable" or "less than Y is desirable".

EXAMPLES

Hereinafter, the present invention will be described based on examples. However, the present invention is not to be interpreted limited by these.

Examples 1-9

BaS, SrS, $Ga_2S_3$ and EuS as starting raw materials were weighed and mixed so that each element was included at the molar ratio indicated in Table 1, which were mixed for 100 minutes with a paint shaker using a Ø3 mm zirconia ball as a medium. Note that the concentrations of the luminescent center indicated in the table are molar ratios when the total amount of the alkaline earth metal M is taken as 1.00 mole.

Then, the obtained mixture was fired with the atmosphere, temperature and time indicated in Table 1. Next, the fired material was crushed for one minute with an automatic mortar grinder ("ALM-360T" manufactured by Nitto Kagaku Co.), and using sieves with 140 mesh and 440 mesh openings, the material under the sieve with 140 mesh opening and above the sieve with 440 mesh opening was recovered to obtain an emitting phosphor powder (sample).

Examples 10-16

SrS, CaS, $Ga_2S_3$ and EuS as starting raw materials were weighed and mixed so that each element was included at the molar ratio indicated in Table 1, which were mixed for 100 minutes with a paint shaker using a Ø3mm zirconia ball as a medium. Note that the concentrations of the luminescent center indicated in the table are molar ratios when the total amount (concentration) of the alkaline earth metal M is taken as 1.00 molar.

Then, the obtained mixture was fired with the atmosphere, temperature and time indicated in Table 1. Next, the fired material was crushed for one minute with an automatic mortar grinder ("ALM-360T" manufactured by Nitto Kagaku Co.), and using sieves with 140 mesh and 440 mesh openings, the material under the sieve with 140 mesh opening and above the sieve with 440 mesh opening was recovered to obtain an emitting phosphor powder

TABLE 1

| | M | | | | Luminescent center | | Firing conditions | | |
|---|---|---|---|---|---|---|---|---|---|
| | Ba | Sr | Ca | Ga/M | Species | Concentration | Temperature | Time | Atmosphere |
| Example 1 | 0.05 | 0.95 | 0 | 2.45 | Eu | 0.01 | 1100 | 4 | $H_2S$ |
| Example 2 | 0.10 | 0.90 | 0 | 2.08 | Eu | 0.01 | 1100 | 4 | $H_2S$ |
| Example 3 | 0.20 | 0.80 | 0 | 2.08 | Eu | 0.01 | 1100 | 4 | $H_2S$ |
| Example 4 | 0.25 | 0.75 | 0 | 2.45 | Eu | 0.01 | 1100 | 4 | $H_2S$ |
| Example 5 | 0.40 | 0.60 | 0 | 2.45 | Eu | 0.01 | 1100 | 4 | $H_2S$ |
| Example 6 | 0.50 | 0.50 | 0 | 2.08 | Eu | 0.01 | 1100 | 4 | $H_2S$ |
| Example 7 | 0.10 | 0.90 | 0 | 2.45 | Eu | 0.01 | 1100 | 4 | $H_2S$ |
| Example 8 | 0.10 | 0.90 | 0 | 2.26 | Eu | 0.01 | 1100 | 4 | Ar |
| Example 9 | 0.10 | 0.90 | 0 | 2.00 | Eu | 0.01 | 1100 | 4 | $H_2S$ |
| Example 10 | 0 | 1.00 | 0 | 2.26 | Eu | 0.01 | 1100 | 4 | Ar |
| Example 11 | 0 | 0.90 | 0.1 | 2.26 | Eu | 0.01 | 1100 | 4 | $H_2S$ |
| Example 12 | 0 | 0.75 | 0.25 | 2.26 | Eu | 0.01 | 1100 | 4 | $H_2S$ |
| Example 13 | 0 | 0.50 | 0.5 | 2.26 | Eu | 0.01 | 1100 | 4 | $H_2S$ |
| Example 14 | 0 | 0.25 | 0.75 | 2.26 | Eu | 0.01 | 1100 | 4 | $H_2S$ |
| Example 15 | 0 | 0.10 | 0.9 | 2.26 | Eu | 0.01 | 1100 | 4 | $H_2S$ |
| Example 16 | 0 | 0 | 1 | 2.24 | Eu | 0.01 | 1100 | 4 | $H_2S$ |

Comparative Examples 1-6

BaS, SrS, $Ga_2S_3$ and EuS as starting raw materials were weighed and mixed so that each element was included at the molar ratio indicated in Table 2, which were mixed for 100 minutes with a paint shaker using a Ø3mm zirconia ball as a medium. Note that the concentrations of the luminescent center indicated in the table are molar ratios when the total amount (concentration) of the alkaline earth metal M is taken as 1.00 molar.

Then, the obtained mixture was fired with the atmosphere, temperature and time indicated in Table 2. Next, the fired material was crushed for one minute with an automatic mortar grinder ("ALM-360T" manufactured by Nitto Kagaku Co.), and using sieves with 140 mesh and 440 mesh openings, the material under the sieve with 140 mesh opening and above the sieve with 440 mesh opening was recovered to obtain an emitting phosphor powder (sample).

Examples 17-19 and Comparative Examples 7-9

Instead of EuS, $Ce_2S_3$, MnS or $Pr_2S_3$, was used, weighed and mixed so that each element was included at the molar ratio indicated in Table 3, which were mixed for 100 minutes with a paint shaker using a Ø3mm zirconia ball as a medium. Note that the concentrations of the luminescent center indicated in the table are molar ratios when the total amount (concentration) of the alkaline earth metal M is taken as 1.00 molar.

Then, the obtained mixture was fired with the atmosphere, temperature and time indicated in Table 3. Next, the fired material was crushed for one minute with an automatic mortar grinder ("ALM-360T" manufactured by Nitto Kagaku Co.), and using sieves with 140 mesh and 440 mesh openings, the material under the sieve with 140 mesh opening and above the sieve with 440 mesh opening was recovered to obtain an emitting phosphor powder (sample).

TABLE 2

| | M | | | | Luminescent center | | Firing conditions | | |
|---|---|---|---|---|---|---|---|---|---|
| | Ba | Sr | Ca | Ga/M | Species | Concentration | Temperature | Time | Atmosphere |
| Comparative Example 1 | 0.9 | 0.1 | 0 | 2.00 | Eu | 0.01 | 950 | 4 | $H_2S$ |
| Comparative Example 2 | 0.75 | 0.25 | 0 | 2.00 | Eu | 0.01 | 950 | 4 | $H_2S$ |
| Comparative Example 3 | 0.5 | 0.5 | 0 | 2.00 | Eu | 0.01 | 950 | 4 | $H_2S$ |
| Comparative Example 4 | 0.25 | 0.75 | 0 | 2.00 | Eu | 0.01 | 950 | 4 | $H_2S$ |
| Comparative Example 5 | 0.1 | 0.9 | 0 | 2.02 | Eu | 0.01 | 950 | 4 | $H_2S$ |
| Comparative Example 6 | 0 | 1 | 0 | 2.00 | Eu | 0.01 | 950 | 4 | $H_2S$ |

TABLE 3

| | M | | | | Luminescent center | | Firing conditions | | |
|---|---|---|---|---|---|---|---|---|---|
| | Ba | Sr | Ca | Ga/M | Species | Concentration | Temperature | Time | Atmosphere |
| Example 17 | 0 | 0.5 | 0.5 | 2.45 | Ce | 0.015 | 1000 | 4 | Ar |
| Comparative Example 7 | 0 | 0.5 | 0.5 | 2.00 | Ce | 0.015 | 1000 | 4 | Ar |
| Example 18 | 0.1 | 0.9 | 0 | 2.45 | Mn | 0.015 | 1000 | 4 | Ar |
| Comparative Example 8 | 0.1 | 0.9 | 0 | 2.00 | Mn | 0.015 | 1000 | 4 | Ar |
| Example 19 | 0.1 | 0.9 | 0 | 2.45 | Pr | 0.015 | 1000 | 4 | Ar |
| Comparative Example 9 | 0.1 | 0.9 | 0 | 2.00 | Pr | 0.015 | 1000 | 4 | Ar |

<XRD Measurement>

An emitting phosphor powder obtained in the examples and the comparative examples served as a sample for x-ray diffraction, this sample was mounted on a holder, and the angles and the intensities of the diffracted beams were measured using MXP18 (manufactured by BRUKER AXS), under the following conditions:
(Tube) Cu Kα beam
(Tube voltage) 40 kV
(Tube current) 150 mA
(Sampling interval) 0.02°
(Scanning speed) 4.0°/min
(Start angle) 5.02°
(End angle) 80°

<Measurement of Internal Quantum Efficiency>

Internal quantum efficiency was measured for the phosphor powders obtained in the examples and the comparative examples, as follows:

Performed using the spectrofluorimeter FP-6500 and the integrating sphere unit ISF-513 (manufacture by JASCO Corporation), and according to a solid-state quantum efficiency calculation program. Note that the spectrofluorimeter was corrected using a secondary reference light source and rhodamine B.

The equations for the calculation of the absorption ratio, the internal quantum efficiency and the external quantum efficiency of the emitting phosphor when the excitation light was 466 nm are shown below:

[Math. 1]

Let $P_1(\lambda)$ be the spectrum of a reference whiteboard, $P_2(\lambda)$ the spectrum of a sample and $P_3(\lambda)$ the spectrum of an indirectly excited sample.

Let the surface $L_1$ comprising the spectrum $P_1(\lambda)$ enclosed by the range of excitation wavelength 451 nm-481 nm be the intensity of excitation.

$$L_1 = \int_{451}^{481} P_1(\lambda) d\lambda$$

Let the surface $L_2$ comprising the spectrum $P_2(\lambda)$ enclosed by the range of excitation wavelength 451 nm-481 nm be the diffusion intensity of the sample.

$$L_2 = \int_{451}^{481} P_2(\lambda) d\lambda$$

Let the surface $E_2$ comprising the spectrum $P_2(\lambda)$ enclosed by the range of excitation wavelength 482 nm-648.5 nm be the fluorescence intensity of the sample.

$$E_2 = \int_{482}^{648.5} P_2(\lambda) d\lambda$$

Let the surface $L_3$ comprising the spectrum $P_3(\lambda)$ enclosed by the range of excitation wavelength 451 nm-481 nm be the intensity of indirect diffusion.

$$L_3 = \int_{451}^{481} P_3(\lambda) d\lambda$$

Let the surface $E_3$ comprising the spectrum $P_3(\lambda)$ enclosed by the range of excitation wavelength 482 nm-648.5 nm be the intensity of indirect fluorescence.

$$E_3 = \int_{482}^{648.5} P_3(\lambda) d\lambda$$

The sample absorbance ratio is the ratio of the fraction of excitation light reduced by the sample over the incident light.

$$A = \frac{L_1 - L_2}{L_1}$$

The external quantum efficiency $\epsilon_{ex}$ is the number of photons $N_{em}$ of the fluorescent light emitted from the sample divided by the number of photons $N_{ex}$ of the excitation light shone on the sample.

$$N_{ex} = k \cdot L_1$$

$$N_{em} = k \cdot \left(E_2 - \frac{L_2}{L_3} E_3\right)$$

$$\therefore \varepsilon_{ex} = \frac{N_{em}}{N_{ex}} = \frac{E_2 - \frac{L_2}{L_1} E_3}{L_1}$$

The external quantum efficiency $\epsilon_{in}$ is the number of photons $N_{em}$ of the fluorescent light emitted from the sample divided by the number of photons $N_{abs}$ of the excitation light absorbed by the sample.

$$N_{ex} = k \cdot (L_1 - L_2)$$

$$N_{ex} = k \cdot E_2$$

$$\therefore \varepsilon_{ex} = \frac{N_{em}}{N_{abs}} = \frac{E_2 - \frac{L_2}{L_1} E_3}{L_1 - L_2}$$

(from JASCO FWSQ-6-17(32) Solid-state Quantum Efficiency Calculation Program manual)

<Measurements of PL Emission Spectrum and CIE Color Coordinates>

Using a spectrofluorimeter (F-4500, manufactured by Hitachi), PL (photo-luminescence) spectra were measured and PL light-emission intensities were determined for the emitting phosphor powders obtained in the examples and the comparative examples.

In addition, the brightness and the light-emission color (xy values of the CIE color coordinates) were determined from the PL emission spectrum.

In the following Table 4, in the XRD pattern using a Cu Kα beam, the proportion of the diffraction intensity of the maximum peak appearing at diffraction angle 2θ=16.0 to 18.0° with respect to the diffraction intensity of the maximum peak appearing at diffraction angle 2θ=23.6 to 24.8° is indicated as "Condition (A): (16.0 to 18.0°)/(23.6 to 24.8°)" and the proportion of the diffraction intensity of the maximum peak appearing at diffraction angle 2θ=33.6 to 36.0° with respect to the diffraction intensity of the maximum peak appearing at diffraction angle 2θ=37.5 to 39.5° is indicated as "Condition (B): (33.6 to 36.0°)/(37.5 to 39.5°)".

TABLE 4

|  | XRD intensity ratio | | Internal | |
| --- | --- | --- | --- | --- |
|  | Condition (A): (16.0 to 18.0°)/ (23.6 to 24.8°) | Condition (B): (33.6 to 36.0°)/ (37.5 to 39.5°) | quantum efficiency (%) | Emission wavelength (nm) |
| Example 1 | 1.49 | 3.63 | 65.5 | 535 |
| Example 2 | 0.67 | 1.44 | 67.0 | 534 |
| Example 3 | 0.66 | 1.43 | 62.6 | 532 |
| Example 4 | 0.72 | 1.58 | 64.3 | 531 |
| Example 5 | 0.51 | 1.02 | 64.4 | 530 |
| Example 6 | 0.75 | 1.62 | 64.0 | 530 |
| Example 7 | 0.77 | 1.80 | 63.2 | 533 |
| Example 8 | 1.30 | 3.72 | 56.7 | 534 |
| Example 9 | 0.69 | 1.49 | 57.5 | 533 |
| Example 10 | 1.16 | 4.99 | 58.4 | 536 |
| Example 11 | 1.22 | 3.23 | 69.0 | 540 |
| Example 12 | 1.98 | 2.00 | 66.2 | 544 |
| Example 13 | 2.41 | 3.95 | 67.0 | 550 |
| Example 14 | 2.86 | 1.78 | 61.7 | 554 |
| Example 15 | 3.21 | 2.53 | 67.4 | 558 |
| Example 16 | 7.11 | 5.00 | 71.9 | 562 |
| Comparative Example 1 |  | 0.37 | 11.2 | 507 |
| Comparative Example 2 |  | 0.41 | 16.5 | 511 |
| Comparative Example 3 | 0.39 | 0.50 | 37.9 | 521 |
| Comparative Example 4 | 0.38 | 0.67 | 54.9 | 532 |
| Comparative Example 5 | 0.39 | 0.64 | 53.9 | 537 |
| Comparative Example 6 | 0.38 | 0.68 | 45.0 | 562 |
| Example 17 | 1.25 | 4.00 | 53.0 | 450 |
| Comparative Example 7 | 0.38 | 0.65 | 31.0 | 450 |
| Example 18 | 3.21 | 2.55 | 41.0 | 700 |
| Comparative Example 8 | 0.33 | 0.41 | 35.0 | 700 |
| Example 19 | 1.85 | 2.10 | 30.0 | 650 |
| Comparative Example 9 | 0.36 | 0.54 | 25.0 | 650 |

Note that no peak was present at 23.6 to 24.8° for Comparative Examples 1 and 2.

(Discussion)

When the excitation spectra and emission spectra were measured for the emitting phosphor powders obtained in Examples 1-19 and Comparative Examples 1-9, they were sufficiently excited by a light of 250 nm to 510 nm wavelength (that is to say, violet light to blue light) and two peaks were observed in the excitation spectra, confirming that they were more sufficiently excited by near-ultraviolet light and blue light.

Regarding Examples 1-12, they demonstrated light-emission peak positions within the range of 530 nm±10 nm to 545 nm±10 nm wavelength, confirming that a green color light in a range of x=0.20 to 0.35, y=0.66 to 0.75 CIE color coordinates was emitted.

In addition, regarding Examples 13-16, they demonstrated light-emission peak positions within the range of 550 nm±10 nm to 565±10 nm wavelength, confirming that a yellow color light in a range of x=0.35 to 0.50, y=0.50 to 0.65 CIE color coordinates was emitted.

Further in addition, regarding Example 17, it demonstrated light-emission peak positions within the range of 450 nm±30 nm wavelength and emitted a blue color light in a range of x=0.1 to 0.2, y=0.05 to 0.2 CIE color coordinates, and regarding Examples 18 and 19, they demonstrated light-emission peak positions within the range of 650 nm±30 nm to 700±30 nm wavelength and emitted a red color light in a range of x=0.65 to 0.72, y=0.2 to 0.3 CIE color coordinates.

From the results of Table 4, it was found that the internal quantum efficiencies were remarkably high for the emitting phosphors of Examples 1-16 compared to the emitting phosphors of Comparative Example 1-6, in addition, the internal quantum efficiencies are also high regarding Examples 17-19, compared to the Comparative Examples 7-9, which used the same activators.

Figure 3:
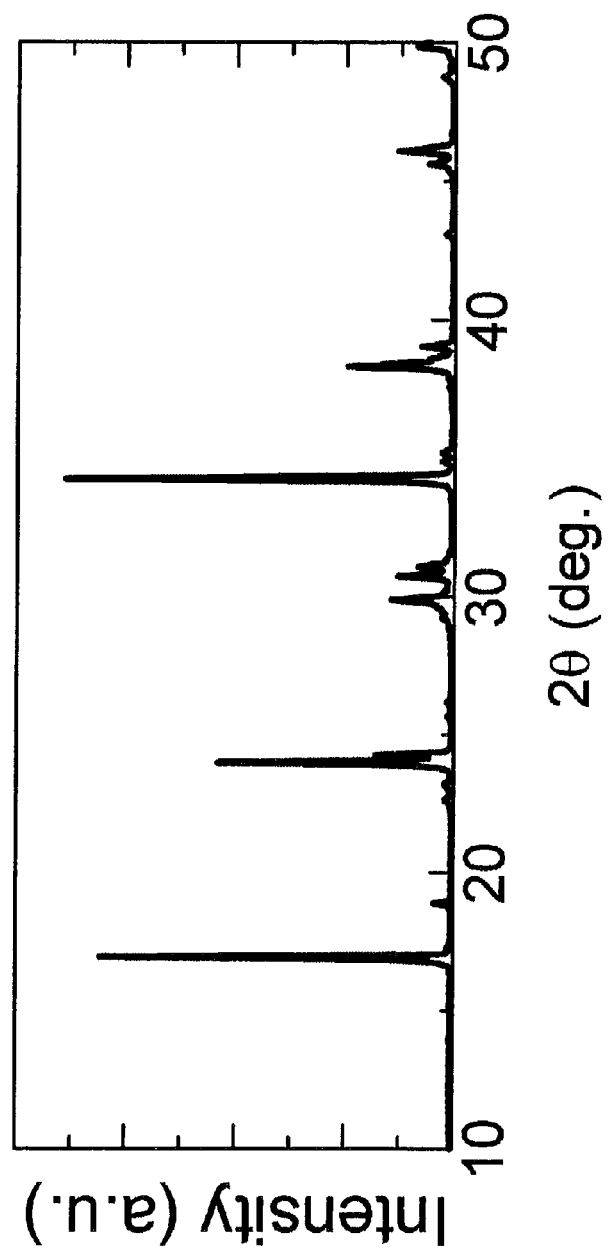
FIG. 3 shows XRD pattern for Example 1.
Figure 4:
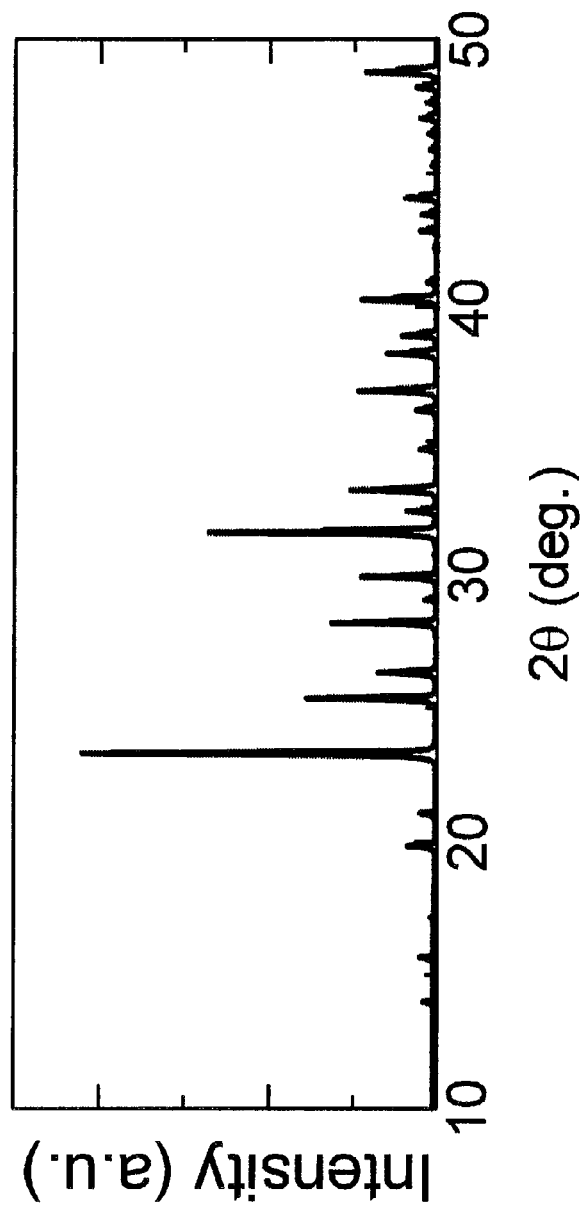
FIG. 4 shows XRD pattern for Comparative Example 1.
Figure 5:
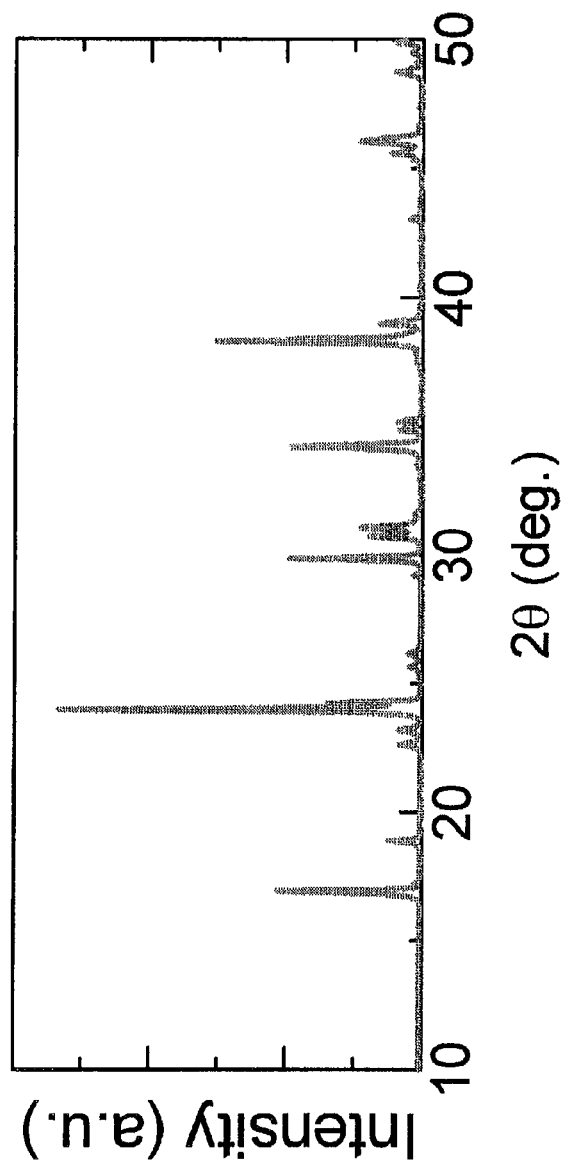
FIG. 5 shows XRD pattern for Comparative Example 5.

The XRD pattern of Example 1 is shown in FIG. 3 as a representative example of the XRD patterns for Examples 1-19 and the XRD patterns of Comparative Examples 1 and 5 are shown in FIG. 4 and FIG. 5 for comparison.

It was found that, compared to the XRD patterns of the Comparative Example 5 and a conventional orthorhombic crystal system emitting phosphor ($SrGa_2S_4$), in the XRD patterns of the present emitting phosphor (Examples 1-19), the diffraction intensities of the maximum peaks appearing at diffraction angle 2θ=16.0 to 18.0° and at diffraction angle 2θ=33.6 to 36.0° were large, while the diffraction intensities of the maximum peaks appearing at diffraction angle 2θ=23.6 to 24.8° and at diffraction angle 2θ=37.5 to 39.5° were small.

From such considerations, the examples and the comparative examples were plotted in a coordinate in which the proportion of the diffraction intensity of the maximum peak appearing at diffraction angle 2θ=16.0 to 18.0° with respect to the diffraction intensity of the maximum peak appearing at diffraction angle 2θ=23.6 to 24.8° is indicated on the horizontal axis and the internal quantum efficiency is indicated on the vertical axis to construct FIG. 1, and as a result, the internal quantum efficiency is thought to become remarkably higher if the proportion of the diffraction intensity of the maximum peak appearing at diffraction angle 2θ=16.0 to 18.0° with respect to the diffraction intensity of the maximum peak appearing at diffraction angle 2θ=23.6 to 24.8° is 0.4 or greater.

Note that as the upper limit, 10 or less is thought to be desirable in order to maintain the crystal structure.

Figure 2:
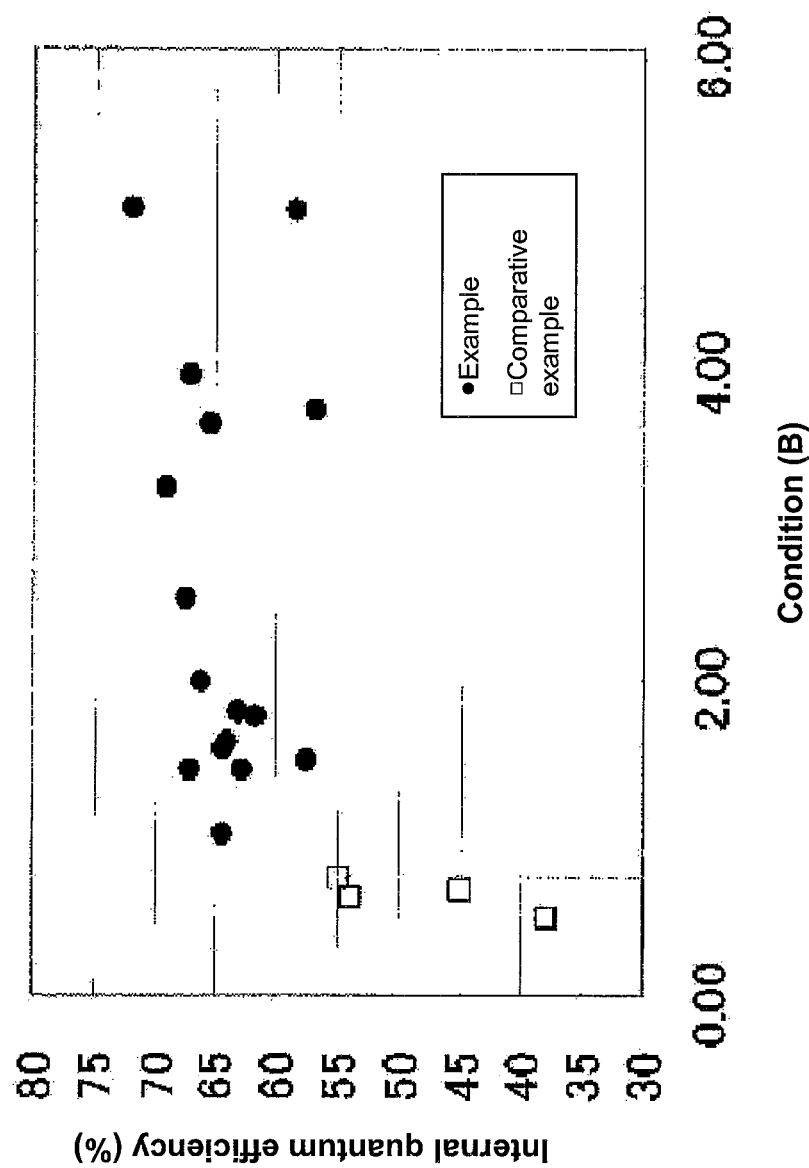
FIG. 2 in which the values for the emitting phosphor powders obtained in Examples 1-19 and Comparative Examples 1-9 have been plotted on the coordinates comprising the horizontal axis: proportion of the diffraction intensity of the maximum peak appearing at diffraction angle $2\theta=33.6$ to $36.0°$ with respect to the diffraction intensity of the maximum peak appearing at diffraction angle $2\theta=37.5$ to $39.5°$; and the vertical axis: internal quantum efficiency (%)

Similarly, the examples and the comparative examples were plotted in a coordinate in which the proportion of the diffraction intensity of the maximum peak appearing at diffraction angle 2θ=33.6 to 36.0° with respect to the diffraction intensity of the maximum peak appearing at diffraction angle 2θ=37.5 to 39.5° is indicated on the horizontal axis and the internal quantum efficiency is indicated on the vertical axis to construct FIG. 2, and as a result, the internal quantum efficiency is thought to become remarkably higher if the proportion of the diffraction intensity of the maximum peak appearing at diffraction angle 2θ=33.6 to 36.0° with respect to the diffraction intensity of the maximum peak appearing at diffraction angle 2θ=37.5 to 39.5° is 0.7 or greater.

Note that as the upper limit, 10 or less is thought to be desirable in order to maintain the crystal structure.

The invention claimed is:

1. An emitting phosphor comprising an orthorhombic crystal system shown as $MGa_2S_4$ (M=Ba, Sr and/or Ca) as a host material, wherein the orthorhombic crystal system has, in an XRD pattern using a Cu Kα beam, a proportion of the diffraction intensity of the maximum peak appearing at diffraction angle 2θ=33.6 to 36.0° with respect to the diffraction intensity of the maximum peak appearing at diffraction angle 2θ=37.5 to 39.5° of 0.7 or greater, and wherein the molar ratio of Ga to M is greater than 2:1.

2. The emitting phosphor according to claim 1, wherein the orthorhombic crystal system has, in an XRD pattern using a Cu Kα beam, a proportion of the diffraction intensity of the maximum peak appearing at diffraction angle 2θ=16.0 to 18.0° with respect to the diffraction intensity of the maximum peak appearing at diffraction angle 2θ=23.6 to 24.8° of 0.4 or greater.

3. The emitting phosphor according to claim 1, wherein the orthorhombic crystal system is a sulfide comprising Ga and one species of alkaline earth metal M among Ba, Sr and Ca, or two species or more among these, and the ratios of the contents in Ba, Sr and Ca occupied in the alkaline earth metal M satisfy the following Formula (1):

$$M=Ba_xSr_{1-x-y}Ca_y, \text{ (}x \text{ is 0 or greater but 0.6 or less and } y \text{ is 0 or greater but 1 or less).} \qquad (1)$$

4. The emitting phosphor according to claim 2, wherein the orthorhombic crystal system is a sulfide comprising Ga and one species of alkaline earth metal M among Ba, Sr and Ca, or two species or more among these, and the ratios of the contents in Ba, Sr and Ca occupied in the alkaline earth metal M satisfy the following Formula (1):

$$M=Ba_xSr_{1-x-y}Ca_y, \text{ (}x \text{ is 0 or greater but 0.6 or less and } y \text{ is 0 or greater but 1 or less).} \qquad (1)$$

5. The emitting phosphor according to claim 1, comprising as an activator one species among Eu, Ce, Mn and Sm, or two species or more among these.

6. The emitting phosphor according to claim 2, comprising as an activator one species among Eu, Ce, Mn and Sm, or two species or more among these.

7. An emitting phosphor comprising
an orthorhombic crystal system shown as $MGa_2S_4$ (M=Ba, Sr and/or Ca) as a host material; and, as an activator one species among Eu, Ce, Mn and Sm, or two species or more among these;

wherein, the orthorhombic crystal system has, in an XRD pattern using a Cu Kα beam, a proportion of the diffraction intensity of the maximum peak appearing at diffraction angle 2θ=33.6 to 36.0° with respect to the diffraction intensity of the maximum peak appearing at diffraction angle 2θ=37.5 to 39.5° of 0.7 or greater; and, a proportion of the diffraction intensity of the maximum peak appearing at diffraction angle 2θ=16.0 to 18.0° with respect to the diffraction intensity of the maximum peak appearing at diffraction angle 2θ=23.6 to 24.8° of 0.4 or greater;

wherein, the orthorhombic crystal system is a sulfide comprising Ga and one species of alkaline earth metal M among Ba, Sr and Ca, or two species or more among these, and the ratios of the contents in Ba, Sr and Ca occupied in the alkaline earth metal M satisfy the following Formula (1):

$$M=Ba_xSr_{1-x-y}Ca_y, \text{ (}x \text{ is 0 or greater but 0.6 or less and } y \text{ is 0 or greater but 1 or less), and} \qquad (1)$$

wherein the molar ratio of Ga to M is greater than 2:1.

8. The emitting phosphor according to claim 1, wherein the emitting phosphor is obtained using a firing temperature of at least 1050° C.

9. The emitting phosphor according to claim 7, wherein the emitting phosphor is obtained using a firing temperature of at least 1050° C.

* * * * *